United States Patent [19]

Silfvast

[11] 4,101,396
[45] Jul. 18, 1978

[54] ISOTOPE ENRICHMENT BY RESONANCE TRAPPING

[75] Inventor: William Thomas Silfvast, Holmdel, N.J.

[73] Assignee: Bell Telephone Laboratories, Incorporated, Murray Hill, N.J.

[21] Appl. No.: 753,707

[22] Filed: Dec. 23, 1976

[51] Int. Cl.² ............................ B01J 1/10; B01D 53/00
[52] U.S. Cl. ....................... 204/157.1 R; 204/DIG. 11; 55/6
[58] Field of Search ................. 204/DIG. 11, 157.1 R, 204/164, 165; 55/2, 5, 6

[56] References Cited

U.S. PATENT DOCUMENTS 4,024,217  5/1977  Wexler et al. ............... 204/DIG. 11

FOREIGN PATENT DOCUMENTS 2,312,194  10/1973  Fed. Rep. of Germany ... 204/DIG. 11

Primary Examiner—Howard S. Williams
Attorney, Agent, or Firm—Daniel D. Dubosky

[57] ABSTRACT

A photochemical method for changing the isotopic composition of an element is disclosed. The method involves passing an electron discharge through a mixture of a buffer gas, which controls the uniformity and electron temperature of the discharge, and a vapor of the element. By means of the phenomenon of resonance radiation trapping, the electron discharge preferentially excites and ionizes one isotope. Removal of the ions by cataphoresis separates the element into two amounts with different isotopic ratios.

20 Claims, 3 Drawing Figures

ISOTOPE ENRICHMENT BY RESONANCE TRAPPING

BACKGROUND OF THE INVENTION

Isotopes (from the Greek for "same place") of an element differ only in the number of neutrons in their nuclei. The number of protons and electrons for different isotopes of the same element is exactly the same and therefore the chemical properties of the isotopes are the same. Separation, then, depends on subtle differences in physical properties.

Isotope separation was performed on a laboratory scale before World War II prompted a massive exploration of possible methods. Since the War, there has been continued interest, prompted by the high capital and operating costs of the present methods.

It is convenient to divide the prior art into three classes:

The first class consists of those methods that do not ionize the atoms or molecules of the isotopes. This class includes the gaseous diffusion method, the principle of which is that molecules containing a heavier isotope will move less quickly through a membrane than will those containing a lighter one. As the difference in mass is small for the two species of uranium hexafluoride, for example, the amount of separation achieved by each step of the process is also small and many steps are required.

In contrast, separation methods that involve ionization feature large amounts of separation per step. The second class of methods involves the ionization of all isotopic species and separation of ions by mass. An example of this class is the electromagnetic apparatus, in which a combination of electric and magnetic fields produces a force on an ion that is directly related to its mass. This method is characterized by a high degree of separation and low limits on the amount of material that a device is capable of processing.

Methods in the last class are those in which one isotope is ionized (or excited) to a greater degree than the other (or others). This class is generally referred to as photochemical separation, whether the step of ion removal is done by physical means (such as deflecting the ions by a magnetic or electrostatic field), or by chemical means (such as an endothermic reaction that is not energetically available to an unexcited atom). This class has been a popular research area in recent years, with an emphasis on the use of lasers to excite or ionize one isotope in preference to others.

Different isotopes emit radiation from the same excited state at different frequencies, the difference in frequency being referred to as the isotope shift. The magnitude of an isotope shift will vary, depending on the isotope being compared, the temperature, the particular state involved, etc. When a particular isotopic shift is great enough so the ranges of the wavelengths emitted by the respective isotopes do not overlap, it is possible to excite only one of two or more isotopic species.

The standard approach of the photochemical art has been to use a laser with a frequency band narrower than the isotopic shift so that radiation that is tuned to the frequency emitted by one isotope will not interact with another isotope.

A succint statement is contained in a report, *Photochemical Isotope Separation as Applied to Uranium* by R. L. Farrar, Jr. and I. F. Smith, K-L-3054, Oak Ridge Gaseous Diffusion Plant, Oak Ridge, Tennessee (1972) which states "The principal requirements for the successful application of the process involve three considerations. First, an isotopic shift must exist in the absorption spectra of the element or one of its compounds so that only one isotopic species of the process material can be excited or activated. Second, a light souce or an energy source must be obtained which is capable of emitting light at a very narrow wavelength, sufficiently narrow and at the proper frequency to excite only one of the desired group of isotopic species. Third, a chemical reaction or a physical process must be found in which only the exited species takes part. This process could, in principle, separate a middle isotope as easily as an end one, in a group of three or more isotopic species."

In contrast to the prior photochemical art, the present invention does not employ an external source of radiation to excite and ionize one isotope, as is stated in the second requirement given immediately above.

The prior art closest in structure to the present work ("Tests on the Separation of Isotope Molecules in a DC-Glow Discharge", W. Groth, P. Harteck, *Naturwissenschaften*, 22, p. 390, (1939)) achieved separation of hydrogen and deuterium in an electron discharge in an apparatus of different structure, by means of a different mechanism. In contrast to the present work, they used a hydrogen-deuterium mixture, and ionized both hydrogen and deuterium, the separation of which was accomplished as a result of the slower mobility of hydrogen molecular ions.

They attemtped to separate other elements (neon and xenon) but were unable to observe any separation, presumably because other elements have less difference in mobility between isotopes. This portion of their work teaches away from the present invention.

SUMMARY OF THE INVENTION

The invention is a method of increasing the concentration of one isotopic species in a quantity of an element. Practice of the invention involves the use of an electron discharge that excites the atoms of different isotopes to a different extent, utilizing the phenomenon of resonance trapping.

The element to be separated is vaporized and mixed with a buffer gas, the density of the vapor being set to a value such that the resonance radiation from one isotope is weakly trapped, i.e., is absorbed and reemitted only a few or no times before it leaves the vapor, and that from another, more abundant isotope is strongly trapped in the vapor, i.e., is absorbed and reemitted many times. An electric discharge is passed through the mixture, exciting the resonance states of both isotopes. The trapped radiation from these states remains in the vapor while it is emitted and absorbed many times and the untrapped radiation escapes from the vapor after a few or no absorptions and emissions. As a result of the repeated absorption and reemission, the exited state lifetime of the strong isotope is effectively increased, with the result that the more abundant isotope will be excited to a greater degree than the less abundant isotope.

Once the isotopes have been differentially excited, they may be separated by means a chemical reaction which is energetically possible for the atoms in this excited state but not for those in the ground state.

Alternatively, the excited atoms may be ionized, either by a further collision with an electron or by use of light of appropriate wavelength, and the ions removed from the vapor by electrostatic or electromagnetic means or a combination of the two.

The buffer gas to which the vapor is added performs two functions: it smooths out the electron discharge and it controls the electron temperature of the plasma. The discharge has been observed to be considerably more uniform, and thus more effective, with a buffer gas then it is with pure hydrogen.

The buffer gas also regulates the electron temperature, which is subject to three considerations; a sufficient number of electrons must have an energy great enough to ionize the atoms in the resonant states, the number of electrons with energy great enough to ionize atoms in the ground state must be small enough so that the differential ionization from the excited states is not spoiled, and reaction rates for those reactions that transfer energy from the strong isotope to the weak must also be small enough so that the isotope differentiation is not spoiled.

BRIEF DSCRIPTION OF THE DRAWINGS

DETAILED DESCRIPTION

Figure 1:
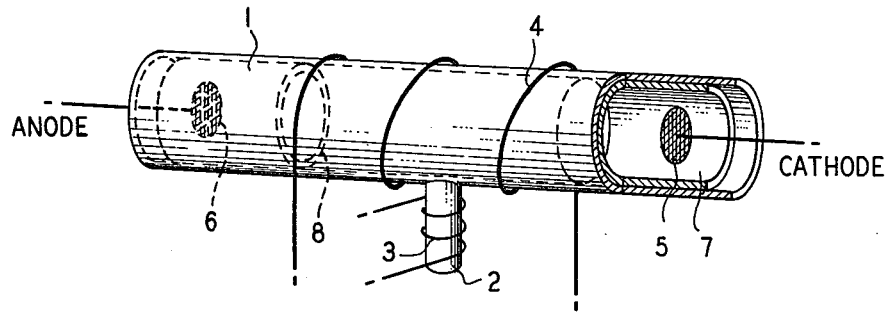
FIGS. 1 and 2 are sketches of apparatus in which the method may be practiced.

The method will be described with reference to a simple apparatus, shown partially in schematic, partially in pictorial form in FIG. 1. This apparatus, which is designed for an element that is solid at room temperature, is shown for the purpose of illustrating the method and is not meant to limit the scope of the invention. Variations of the apparatus will be readily apparent to one skilled in the art.

Isotope separation takes place within a discharge tube 1 having a sidearm 2 in which the element to be separated is inserted by means not shown. The tube is evacuated and filled with a buffer gas to a predetermined pressure. Sidearm 2 is then heated to a temperature sufficiently high to vaporize said element by heating means, illustratively a coil of resistive wire 3. Separate heating means 4 permit the temperature of the body of discharge tube 1 to be heated to a temperature different from that of the sidearm 2. Typically, the temperature in the body of tube 1 is higher than the temperature in sidearm 2, so that the vapor will not condense. The two temperatures are adjusted so that the density of the vapor in tube 1 near the sidearm is a predetermined value. Heating means 3 and 4 are controlled by power supplies of conventional type, not shown. The vapor flows from the sidearm, diffuses through the buffer gas toward the two ends of the tube and eventually condenses on the walls of the tube or on collectos 7, 8, which are maintained at a temperature which permits condensation. Collectors 7, 8 are illustratively cylinders fitting closely into the tube, and are periodically removed for chemical processing of the element. Other collector configurations will be apparent to those skilled in the art. As a result of the separation method to be described hereinafter, the element deposited on the collectors will be enriched in one or another isotope compared to the isotopic composition of the feedstock.

During operation of the apparatus, a DC electric discharge supplied by a power supply not shown passes between the cathode 5 and anode 6 of the discharge tube. As the electrons in the discharge tube pass down the tube, they excite the resonance states (by which term is meant those few atomic states that are most easily excited) in the vapor. Near the ends of the tube where the density of the vapor is low, the radiation emitted by these resonance states will often strike the walls of the discharge tube without being absorbed by the vapor. A quantity called the trapping factor F, is the inverse of the number of times a resonance photon is absorbed and reemitted before it strikes the walls.

As the density of the vapor increases near the sidearm, the radiation begins to be absorbed and reemitted before it escapes from the vapor, the density of the vapor being controlled so that over a portion of the discharge tube the radiation from the less abundant isotope (referred to as the weak isotope) is absorbed and reemitted only a few or no times and the radiation from the more-abundant isotope (referred to as the strong isotope), is absorbed and emitted many times. In this case, radiation from the weak isotope is said to be untrapped and radiation from the strong isotope is said to be trapped. Throughout the region of trapping, the resonance radiation from the weak isotope is quickly lost from the vapor, while the resonance radiation from the strong isotope remains in the vapor, with the result that the strong isotope has a greater fraction of its atoms in the excited state than does the weak isotope.

This differential excitation "marks" the two isotopes and serves as the basis for separation. One method of separation is chemical: a compound is introduced into the discharge tube which will react with an excited atom but not with an atom in the ground state. The product of that reaction is removed and chemical processes are used to recover the element from the product, which amount of the element will be enriched in the strong isotope. The residue left after this step will be enriched in the weak isotope.

The Farrar and Smith reference, cited above, discusses chemical reactions involving mercury, covering several reactions reported in the prior art. These prior art works used light to ionize preferentially a desired isotope and then removed the ions by means of a chemical reaction. Application of the present method would substitute the resonance trapping method as the ionization mechanism.

Alternatively, the excited atoms may be ionized, by the electron discharge or by a laser, and the ions removed from the plasma formed by the discharge. Illustratively, the ions may be removed by cataphoresis. The positive ions drift toward the cathode, enriching the vapor that diffuses toward the cathode in the strong isotope, and depleting the vapor that diffuses toward the anode in the strong isotope or, equivalently, enriching it in the weak isotope.

The buffer gas is selected to have an ionization potential greater than that of the element being separated and should not combine chemically with the element. Helium was chosen as the buffer gas for the illustrative embodiment in which hydrogen and deuterium are separated. The pressure of the buffer gas should be set at a value that balances reduction of electron temperature and uniformity of the discharge.

Higher buffer gas pressures tend to reduce the electron temperature of the plasma, a desirable effect that reduces the amount of direction ionization of atoms in the ground state and therefore improves the degree of separation. The electron temperature of the discharge should be high enough for the electrons to excite the resonant states and to ionize the excited atoms (if the electron discharge is used for ionization as well as excitation).

Some direct ionization will be produced, of course, by the highest-energy electrons in the beam (which is assumed to have a Maxwell distribution), but the electron temperature should not be so high that a significant amount of atoms are ionized directly from the ground state, as direct ionization tends to spoil the isotopic differentiation provided by the radiation trapping.

The buffer gas pressure is limited by the tendency of higher pressures to confine the discharge to the center of the tube, reducing efficiency. Another limit on the buffer gas pressure is provided by exchange reactions in which an excited or ionized atom of the strong isotope transfer its energy to an atom of the weak isotope, an effect that tends to increase the number of ions of the weak isotope. These exchange reactions occur during the time required for the ions of the strong isotope to diffuse to the wall of the discharge tube, and a reduction in this diffusion time will therefore tend to improve the degree of isotopic separation. High buffer gas pressure tends to increase the diffusion time and therefore to spoil the isotopic separation.

A balance must be struck among these competing considerations, efficiency and differentiation. The optimum for a particular combination of apparatus dimension, element and buffer gas will vary in a complicated fashion, depending on cross sections that have usually not been measured. The detrimental effects discussed above are not critical, tending to reduce the amount of separation rather than to eliminate it entirely. An empirical balance between efficiency and differentiation should be used to determined optimum parameters for a particular apparatus in which the method is to be practiced.

The work of Groth and Harteck on hydrogen, referred to above, did not use a buffer gas and ionized both isotopes, making no attempt to achieve isotopic differentiation through differential ionization. In the present work, where the average energy of the electrons in the discharge is less than the ionization energy of the isotopes, it has been found necesary to control the electron energy. This control is accomplished by setting the buffer gas pressure. As discussed above, attempts to practice the present method without the use of a buffer gas have been unsuccessful.

Once there are enough electrons in the discharge to excite resonant states, the magnitude of the electron discharge current is not critical. In order to maximize the population of the resonant excited states the electron collisional deexcitation rate should be large compared with the radiative decay rate.

Figure 2:
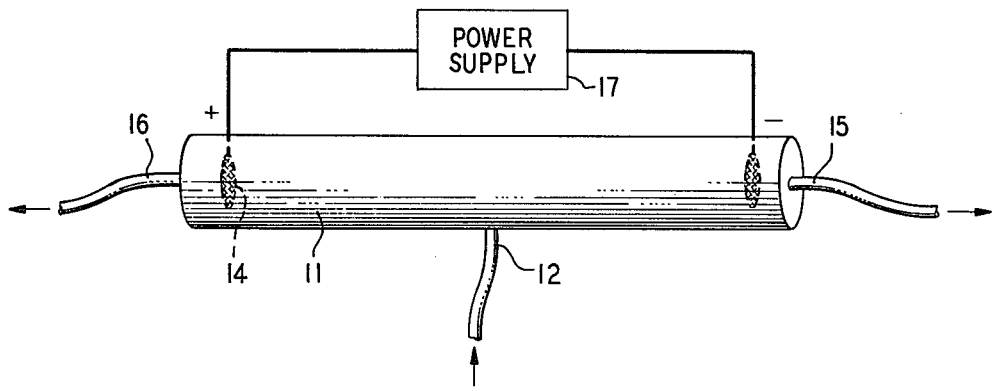
Figure 3:
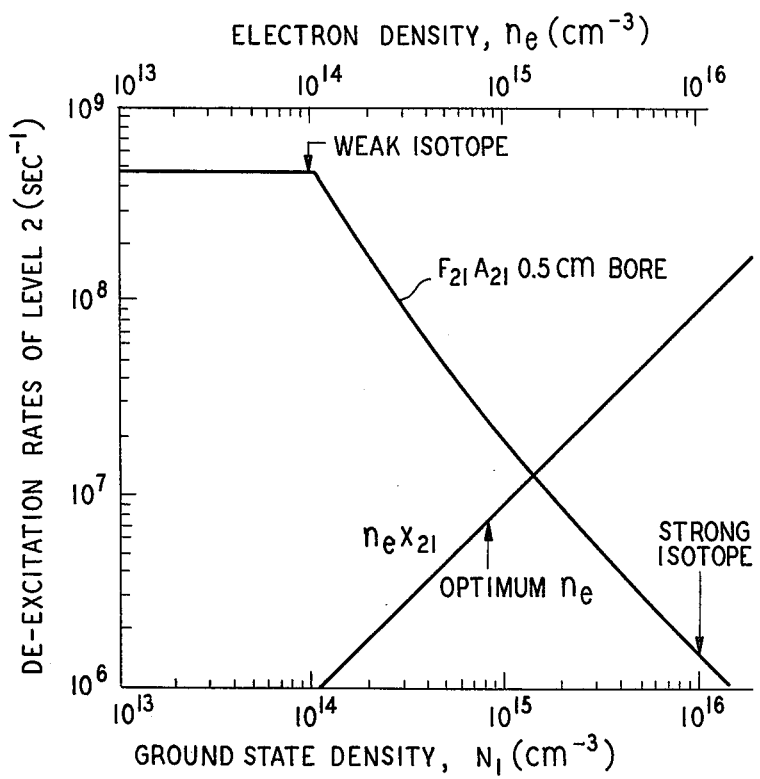
FIG. 3 is a graph showing numerical values of some relevant quantities for the case of hydrogen isotope separation.

FIG. 2 shows an apparatus adapted for the separation of an element that is a gas at room temperature. Discharge tube 11 contains cathode 13 and anode 14, supplied by current from variable power supply 17, of conventional type. A mixture of buffer gas and the element to be separated enters tube 11 via hose connector 12, which is supplied from a feedstock not shown. The gas is vaporized by the electric discharge as soon as it enters tube 1, the buffer gas pressure being selected so the electron temperature of the discharge is high enough to vaporize the gas. The contents of the tube 1 are removed through hose connection 15 and 16 by pumping means of conventional type not shown.

The strong isotope, having been differentially ionized by the process described above, is present in greater concentration in the material pumped out of hose connection 15 than in the feedstock, because the ions are attracted toward the cathode by the phenomenon of cataphoresis. The material pumped out of connection 16, the residue after the ions have been removed, will therefore be enriched in the weak isotope.

The choice of parameters for practice of the method disclosed herein may be better understood with reference to a numerical example. We consider the cause of hydrogen at a temperature of 500° K in discharge tube 1 with a radius of 0.5 centimeter.

For simplicity, we assume that there are only two states involved, the ground state 1 and a resonant state 2, and that the other excited states are in collisional equilibrium with state 2 and need not be considered. Let $N_1$ and $N_2$ be the number of atoms in states 1 and 2, with superscripts $s$ and $w$ to denote the strong and weak isotopes. Let $A_2$ be the radiative decay rate from state 2 to state 1, $F_{21}$ be the trapping factor for the states, $N_e$ be the electron density, and $X_{12}$ and $X_{21}$ be the collisional excitation and deexcitation rates for the levels. Then, the steady state condition in which the number of atoms excited into state 2 is balanced by the number leaving by radiative decay and collisional deexcitation is given by:

$$N_1 n_3 X_{12} = N_2 F_{21} A_{21} + N_2 n_e X_{21} \qquad (1)$$

Writing this equation for the strong and weak isotopes and dividing, we have:

$$D \equiv \frac{N_2{}^s/N_1{}^s}{N_2{}^w/N_1{}^w} = \frac{F_{21}{}^w A_{21} + n_e X_{21}}{F_{21}{}^s A_{21} + n_e X_{21}}. \qquad (2)$$

This quantity D, for differentiation, measures the relative excitation of the two isotopes. In order to distinguish between the isotopes, we wish to increase D. Since $A_{21}$ and $X_{21}$ are fixed for a particular vapor temperature and electron temperature, the adjustable parameters are the trapping factors and the electron density. FIG. 2 plots the quantities $F_{21}A_{21}$ and $n_e X_{21}$ as a function of $N_1$ and $n_e$ respectively. Since we wish to keep the excited state population of the weak isotope low, we typically pick $N_1{}^w$ such that $F_{21}{}^w \approx 1$, as indicated by the arrow giving $F_{21}{}^w A_{21} \approx 5 \times 10^8 \sec^{-1}$ and $N_1{}^w \approx 1 \times 10^{14} cm^{-3}$. The value for $F_{21}{}^s A_{21}$ is then determined by the isotopic ratio of the feedstock (assumed for purpose of illustration to be 100:1) to be 1.5 $\times 10^6$, giving $F_{21}{}^s A_{21} \approx 1.5 \times 10^6 \sec^{-1}$. In order to maximize the population of the strong excited state, we select $n_e$ so that $n_e X_{21}$ is much greater than $F_{21}{}^s A_{21}$, choosing, for purpose of illustration, a value of 7.5 × $10^6 \sec^{-1}$. The result is D $\approx$ 60, i.e., the strong isotope is 60 times more excited than the weak isotope.

The trapping factor is calculated according to a formula given by Holstein ("Imprisonment of Resonance Radiation in Gases II", *Physical Review*, Vol. 33, (1951) page 1159). As its name implies, the trapping factor measures the degree to which radiation is confined by successive absorptions and reemissions. It appears in a product with the radiative decay rate $A_{21}$. Since the decay rate cannot be greater than that of an isolated atom, only values of F less than or equal to one are of significance. In the particular case of a long cylinder, $F_{21} = 1.60/k_oR[\pi \log(k_oR)]^{\frac{1}{2}}$ where R is the radius of the discharge tube and $k_o$ is the absorption coefficient, which depends on gas density, temperature and frequency.

In this illustrative embodiment, the partial pressure of the buffer gas was between 2 and 3 Torr, which resulted in an average energy for the electrons of between 2 and 4 electron volts. This range was found to be in the optimum balance between efficiency and differentiation for this particular apparatus.

In the extreme case when the feedstock has equal concentrations of isotopes, D = 1, since $F_{21}^w = F_{21}^s$, and this method will not produce differential excitation. Conversely, the method produces better separation when the input isotope ratio is large, i.e., the method is best suited for the case where the desired isotope is present in a small concentration or a large consentration. When the desired isotope is the weak one, the output comes from the collector at the anode, since the strong isotope is pulled toward the cathode by cataphoresis. Similarly, when the desired isotope is the strong one, the collector, at the cathode will be used for the output.

The invention has been reduced to practice, separating hydrogen and deuterium for the case where hydrogen is the strong isotope and also for the case where hydrogen is the weak isotope. In both cases, the strong isotope concentrated at the cathode, demonstrating that the resonance trapping differential ionization method was working.

If the effect noticed on the Groth et al reference cited above had been the only one operating, then deuterium would have concentrated at the cathode in both cases.

What is claimed is:

1. A method of altering the isotopic composition of a quantity of an element comprising the steps of:
   producing a quantity of elemental vapor from a feedstock quantity of the element in such a manner that the partial pressure of the vapor generated is substantially equal to a predetermined value, whereby the trapping factor of a less-abundant isotope is greater than the trapping factor of a more-abundant isotope;
   mixing said vapor with a buffer gas having an ionization potential greater than the ionization potential of said element;
   passing a direct current electric discharge through the mixture of said vapor and said buffer gas, which electric discharge excites resonant states of said vapor, whereby the phenomenon of resonance trapping produces a higher proportion of excited atoms in the more-abundant isotope than in the less-abundant isotope;
   ionizing preferentially those atoms which have been excited to said resonant states, and
   removing the ions so produced from said mixture, whereby the material removed contains an enhanced proportion of the more-abundant isotope relative to the proportion in the feedstock and the residue contains an enhanced proportion of the less-abundant isotope relative to the proportion in the feedstock.

2. A method of altering the isotopic composition of a quantity of an element according to claim 1 in which said electric discharge also ionizes preferentially those atoms which have been excited to said resonant states.

3. A method of altering the isotopic composition of a quantity of an element according to claim 2 in which the average energy of the electrons in said electric discharge is less than the ionization potential of said element.

4. A method of altering the isotopic composition of a quantity of an element according to claim 2 in which the partial pressure of said buffer gas is set substantially equal to a pedetermined value, so that the average energy of the electrons in said electric discharge is less than the ionization potential of said element.

5. A method of altering the isotopic composition of a quantity of an element according to claim 1 in which the ionization step is effected by the interaction of electromagnetic radiation with said excited atoms.

6. A method of altering the isotopic composition of a quantity of an element according to claim 5 in which the average energy of the photons of said electromagnetic radiation is greater than the difference between the value of the ionization energy of said element and the value of the highest energy level of said resonant states.

7. A method of altering the isotopic composition of a quantity of an element according to claim 6 in which the average energy of the electrons in the electric discharge is set substantially equal to a predetermined value by adjustment of the partial pressure of the buffer gas.

8. A method of altering the isotopic composition of a quantity of an element according to claim 5 in which the average energy of the electrons in the electric discharge is less than the energy of the lowest of said resonant states.

9. A method of altering the isotopic composition of a quantity of an element according to claim 1 in which the ions produced are removed from the vapor by means of an endothermic chemical reaction with a reaction material, producing a reaction product, whereby said reaction product contains a quantity of said element which contains an enhanced proportion of the more-abundant isotope relative to the proportion in the feedstock and the residue of the mixture remaining after said endothermic chemical reaction contains an enhanced proportion of the less-abundant isotope relative to the proportion in the feedstock.

10. A method of altering the isotopic composition of quantity of an element comprising the steps of mixing an elemental gaseous feedstock of predetermined feedstock density with a buffer gas having an ionization potential greater than the ionization potential of said element,
   passing a direct current electric discharge through the mixture of said feedstock and said buffer gas in such a manner that said electric discharge dissociates said gaseous feedstock into an elemental vapor of said element having a predetermined density determined by said predetermined feedstock density whereby the trapping factor of a less-abundant isotope is greater than the trapping factor of a more-abundant isotope, which electric discharge also excites resonant states of said vapor, whereby the phenomenon of resonance radiation trapping produces a higher proportion of excited atoms in the more-abundant isotope than in the less-abundant isotope;
   ionizing preferentially those atoms which have been excited to said resonant states, and
   removing the ions so produced from the vapor, whereby the material removed contains an enhanced proportion of the more-abundant isotope relative to the proportion in the feedstock and the residue contains an enhanced proportion of the less-abundant isotope relative to the proportion in the feedstock.

11. A method of altering the isotopic composition of a quantity of an element according to claim 10 in which the electron discharge also performs the function of preferential ionization of these atoms which have been excited to said resonant states.

12. A method of altering the isotopic composition of a quantity of an element according to claim 11 in which the average energy of the electrons in said electric discharge is less than the ionization potential of said element.

13. A method of altering the isotopic composition of a quantity of an element according to claim 11 in which the partial pressure of said buffer gas is set substantially equal to a predetermined value, so that the average energy of the electrons in said electric discharge is less than the ionization potential of said element.

14. A method of altering the isotopic composition of a quantity of an element according to claim 10 in which the ionization step is effected by the interaction of electromagnetic radiation with said excited atoms.

15. A method of altering the isotopic composition of a quantity of an element according to claim 14, in which the average energy of the photons of said electromagnetic radiation is greater than the difference between the value of the ionization energy of said element and the value of th highest energy level of said resonant states.

16. A method of altering the isotopic composition of a quantity of an element according to claim 14 in which the average energy of the electrons in the electric discharge is less than the energy of the highest of said resonant states.

17. A method of altering the isotopic composition of a quantity of an element according to claim 14 in which the average energy of the electrons in the electric discharge is set substantially equal to a predetermined value by adjustment of the partial pressure of the buffer gas.

18. A method of altering the isotopic composition of a quantity of an element comprising the steps of
vaporizing a feedstock quantity of the element in such a manner that the partial pressure of the vapor generated is substantially equal to a predetermined value, whereby the trapping factor of a less-abundant isotope is substantially greater than the trapping factor of a more-abundant isotope;
mixing said vapor with a buffer gas having an ionization potential greater than the ionization potential of said element;
passing a direct current electric discharge through the mixture of said vapor and said buffer gas, which electric discharge excites resonant states of said vapor, whereby the phenomenon of resonance trapping produces a higher proportion of excited atoms in the more-abundant isotope than in the less-abundant isotope,
reacting chemically said excited atoms with a reaction material in an endothermic chemical reaction, producing a reaction product, whereby said reaction product contains a quantity of said element which contains an enhanced proportion of the more-abundant isotope relative to the proportion in the feedstock and the residue of the mixture remaining after said endothermic chemical reaction contains an enhanced proportion of the less-abundant isotope relative to the proportion in the feedstock.

19. A method of altering the isotopic composition of a quantity of an element according to claim 18 in which the reaction rate of said endothermic reaction is greater than the reaction rates of all other reactions between said element and said reaction material.

20. A method of altering the isotopic composition of an element comprising the steps of mixing a molecular gaseous feedstock of a predetermined density, the molecules of which feedstock contain atoms of said element, with a buffer gas having an ionization energy greater than the dissociation energy of the molecules of said gaseous feedstock,
whereby the trapping factor of a molecular species containing a less-abundant isotope of said element is greater then the trapping factor of a molecular species containing a more-abundant isotope of said element,
passing a direct current electric discharge through the mixture of said feedstock and said buffer gas in such a manner that said electric discharge excites resonant states of the molecules of said gaseous feestock, whereby the phenomenon of resonance trapping produces a higher proportion of excited molecules containing the more-abundant isotope than of those containing the less-abundant isotope,
dissociating preferentially those molecules which have been excited to said resonant states, whereby dissociation products are formed from the molecules dissociated, and
removing said dissociation products from the mixture of feedstock and buffer gas, whereby the material removed contains an enhanced proportion of the more-abundant isotope relative to the proportion in the feedstock and the residue contains an enhanced proportion of the less-abundant isotope relative to the porportion in the feedstock.

* * * * *